(12) United States Patent (10) Patent No.: US 10,977,867 B2
Balasubramanian (45) Date of Patent: Apr. 13, 2021

(54) AUGMENTED REALITY-BASED AIRCRAFT CARGO MONITORING AND CONTROL SYSTEM

(71) Applicant: Goodrich Corporation, Charlotte, NC (US)

(72) Inventor: Rameshkumar Balasubramanian, Karnataka (IN)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/155,909

(22) Filed: Oct. 10, 2018

(65) Prior Publication Data
US 2020/0058170 A1 Feb. 20, 2020

(30) Foreign Application Priority Data
Aug. 14, 2018 (IN) .............................. 201811030509

(51) Int. Cl.
| | |
|---|---|
| G06T 19/00 | (2011.01) |
| G06Q 50/28 | (2012.01) |
| G06K 7/14 | (2006.01) |
| G06F 3/01 | (2006.01) |
| G02B 27/01 | (2006.01) |
| G06Q 10/08 | (2012.01) |
| G06T 7/20 | (2017.01) |

(52) U.S. Cl.
CPC ............ *G06T 19/006* (2013.01); *G06F 3/017* (2013.01); *G06K 7/1413* (2013.01); *G06K 7/1417* (2013.01); *G06Q 50/28* (2013.01); *G06T 7/20* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 9,686,481 B1 | 6/2017 | Graybill et al. | |
| 9,734,634 B1 | 8/2017 | Mott et al. | |
| 9,934,616 B2 | 4/2018 | Breedvelt-Schouten et al. | |
| 2010/0100225 A1* | 4/2010 | Reed ...................... | B64D 9/00 700/213 |
| 2010/0171828 A1* | 7/2010 | Ishii ........................ | G06T 7/246 348/135 |

(Continued)

FOREIGN PATENT DOCUMENTS

EP 2819100 A1 12/2014

*Primary Examiner* — Michael J Cobb
(74) *Attorney, Agent, or Firm* — Cantor Colburn LLP

(57) ABSTRACT

Embodiments include techniques for a method and system for an augmented reality-based aircraft cargo monitoring and control system. The embodiments include a controlling device in communication with a master control panel (MCP), wherein the controlling device include a capturing module that is configured to receive an image and an object identification module that is configured to detect an identifier of an object from the image. The controlling device also includes a tracking module that is configured to track movement of the object, a rendering module that is configured to overlay an indicator over the image, and a microprojector that is configured to project the image on a display, wherein the display configured to display the mode and status of the object.

14 Claims, 20 Drawing Sheets

1800

(56) References Cited

U.S. PATENT DOCUMENTS

| | | | |
|---|---|---|---|
| 2012/0062445 A1* | 3/2012 | Haddick | G02B 27/017 |
| | | | 345/8 |
| 2012/0183137 A1 | 7/2012 | Laughlin | |
| 2014/0320529 A1* | 10/2014 | Roberts | G06T 19/20 |
| | | | 345/633 |
| 2015/0067580 A1* | 3/2015 | Um | G06F 3/017 |
| | | | 715/781 |
| 2015/0130592 A1* | 5/2015 | Lakshminarayanan | |
| | | | G06K 7/10297 |
| | | | 340/10.1 |
| 2015/0185825 A1 | 7/2015 | Mullins | |
| 2016/0098969 A1* | 4/2016 | Lee | G06F 3/0483 |
| | | | 345/156 |
| 2016/0148417 A1* | 5/2016 | Kim | G06T 19/006 |
| | | | 345/419 |
| 2016/0209648 A1* | 7/2016 | Haddick | G02B 27/0093 |
| 2017/0011561 A1* | 1/2017 | Makke | G07C 5/008 |
| 2017/0213393 A1 | 7/2017 | Fedosov et al. | |
| 2017/0364748 A1 | 12/2017 | Maji et al. | |
| 2018/0122119 A1* | 5/2018 | Dotterweich | G06K 7/10297 |
| 2018/0150186 A1* | 5/2018 | Norieda | G02B 27/0172 |
| 2018/0253671 A1* | 9/2018 | Kuhara | A47L 9/2857 |
| 2019/0096133 A1* | 3/2019 | Crews | G06T 19/006 |
| 2019/0122174 A1* | 4/2019 | Gil | H04W 4/029 |
| 2019/0197787 A1* | 6/2019 | Easter | G06F 3/04883 |
| 2019/0294263 A1* | 9/2019 | Kawana | G06F 3/0346 |
| 2020/0057539 A1* | 2/2020 | Balasubramanian | |
| | | | G06F 3/04886 |
| 2020/0109036 A1* | 4/2020 | Yamakawa | B66C 13/46 |

\* cited by examiner

AUGMENTED REALITY-BASED AIRCRAFT CARGO MONITORING AND CONTROL SYSTEM

CROSS-REFERENCE TO RELATED APPLICATIONS

This application claims the benefit of Indian Application No. 201811030509 filed Aug. 14, 2018, which is incorporated herein by reference in its entirety.

BACKGROUND

The present disclosure generally relates to a system and method for cargo loading management, and more specifically, to an augmented reality-based aircraft cargo monitoring and control system.

The items to be shipped by aircraft cargo are generally are loaded onto unit load devices (ULDs). The ULDs are specially configured pallets or specially configured that are available in various sizes, shapes, and capacities. Once the ULD is loaded, the ULDs are moved in the cargo compartment by power drive units (PDUs) mounted at the floor level at fixed intervals that run the length of the cargo compartment. Upon reaching its final position, the ULD is restrained by means of a mechanical or electro-mechanical restraint system. Turntables can be installed in and forward of the doorway and can steer the ULDs to various positions as needed for in/out, forward/aft, or pallet rotation operations. Multiple ULDs are brought onboard the aircraft and each is placed in its respective stowed position. The PDUs and turntables are hereinafter referred to as line replaceable units (LRUs).

The movement of the ULDs is controlled using a master control panel (MCP) and/or outside control panel (OCP) and/or local control panels (LCPs). The cargo systems provide a dedicated display to enable the operator to monitor the status of ULD position and the status of the cargo LRUs. The MCP provides the control system operation status and cargo system status display. The display additionally enables the operator to perform various maintenance operations on the cargo systems. The MCP, OCP, LCPs, and cargo maintenance display unit (CMDU) are referred to as the primary components of the cargo handling system and are permanently fixed to the aircraft.

BRIEF DESCRIPTION

According to an embodiment, a system for an augmented reality-based aircraft cargo monitoring and control system, the system includes a controlling device in communication with a master control panel (MCP), wherein the controlling device includes a capturing module configured to receive an image, and an object identification module configured to detect an identifier of an object from the image. The controlling device includes a tracking module configured to track movement of the object, a rendering module configured to overlay an indicator over the image, and a microprojector configured to project the image on a display, wherein the display configured to display the mode and status of the object.

In addition to one or more of the features described herein, or as an alternative, further embodiments include an indicator that is based at least in part on data received from the MCP.

In addition to one or more of the features described herein, or as an alternative, further embodiments include a controlling device that is configured to communicate with the MCP to control the movement of the object.

In addition to one or more of the features described herein, or as an alternative, further embodiments include a controlling device that is an eyewear device.

In addition to one or more of the features described herein, or as an alternative, further embodiments include a tracking module that is configured to detect an operator hand as an input to control the object.

In addition to one or more of the features described herein, or as an alternative, further embodiments include an object identifier that is at least one of a QR code or barcode.

In addition to one or more of the features described herein, or as an alternative, further embodiments include a plurality of controlling devices to control the object.

In addition to one or more of the features described herein, or as an alternative, further embodiments include an MCP that is configured to perform a diagnostic test, responsive to an input from an operator, and a display is configured to present results of the diagnostic test.

In addition to one or more of the features described herein, or as an alternative, further embodiments include a controlling device that is configured to operate in a first monitoring mode and a second controlling mode.

In addition to one or more of the features described herein, or as an alternative, further embodiments include an image that is real-time video data of a cargo loading area.

According to a different embodiment, a method for operating an augmented reality-based aircraft cargo monitoring and control system, the method includes receiving, by controlling device, image data including an object, and detecting an identifier of the object from the image data. The method also includes tracking movement of the object, overlaying an indicator over the image, and projecting the image and the indicator over the object on a display.

In addition to one or more of the features described herein, or as an alternative, further embodiments include an indicator that is based at least in part on data received from a master control panel (MCP).

In addition to one or more of the features described herein, or as an alternative, further embodiments include a controlling device that is configured to communicate with the MCP to control the movement of the object.

In addition to one or more of the features described herein, or as an alternative, further embodiments include a controlling device that is comprised in an eyewear device.

In addition to one or more of the features described herein, or as an alternative, further embodiments include a controlling device that is configured to detect an operator hand as an input to control the object.

In addition to one or more of the features described herein, or as an alternative, further embodiments include an object identifier that is at least one of a QR code or barcode.

In addition to one or more of the features described herein, or as an alternative, further embodiments include operating a plurality of controlling devices to control the object.

In addition to one or more of the features described herein, or as an alternative, further embodiments include performing a diagnostic test, responsive to an input from the operator, and presenting results of the diagnostic test.

In addition to one or more of the features described herein, or as an alternative, further embodiments include operating the controlling device in a first monitoring mode and a second controlling mode.

In addition to one or more of the features described herein, or as an alternative, further embodiments include an image that is real-time video data of a cargo loading area.

BRIEF DESCRIPTION OF THE DRAWINGS

The following descriptions should not be considered limiting in any way. With reference to the accompanying drawings, like elements are numbered alike.

DETAILED DESCRIPTION

Currently, the primary components (MCP, OCP, LCPs, and CMDU) of the cargo handling system are permanently fixed to the aircraft. The fixed nature of the cargo components requires the operator to always be positioned in proximity of the control panels or the display unit. When the ULDs are loaded, the operator is required to maneuver around the limited space available between the interior wall of the aircraft and the ULD. The MCP and LCP work in relation.

The operator monitors the ULD status and LRU status through the CMDU. The CMDU displays ULDs as a box-like representation and the movement of ULDs through a change in color of the LRUs. The graphical user interface is very primitive that the operator should correlate the displayed status with the actual ULD movement and LRU status.

The control panels (MCP, LCP, and OCP) and the display units (CMDU) are permanently fixed to the aircraft which adds substantial weight to the aircraft. Operators may be required to navigate tight spaces between the ULD and the aircraft wall, due to the fixed nature and location of the control panels and display unit. This configuration can result in an unsafe environment for the operator when loading and unloading the cargo from the cargo compartment.

In addition, the fixed control panels demand switching the operational control from the MCP to LCP and vice versa during loading/unloading of cargo ULDs which limits the number of ULDs to be operated to a single ULD at any given time. Finally, the actual movement of the ULDs is not displayed in the display unit, instead, the movement of the ULDs has to be monitored through the LRU status making it difficult to understand the display and demands well-trained personnel to monitor the cargo loading/unloading operations.

Figure 1:
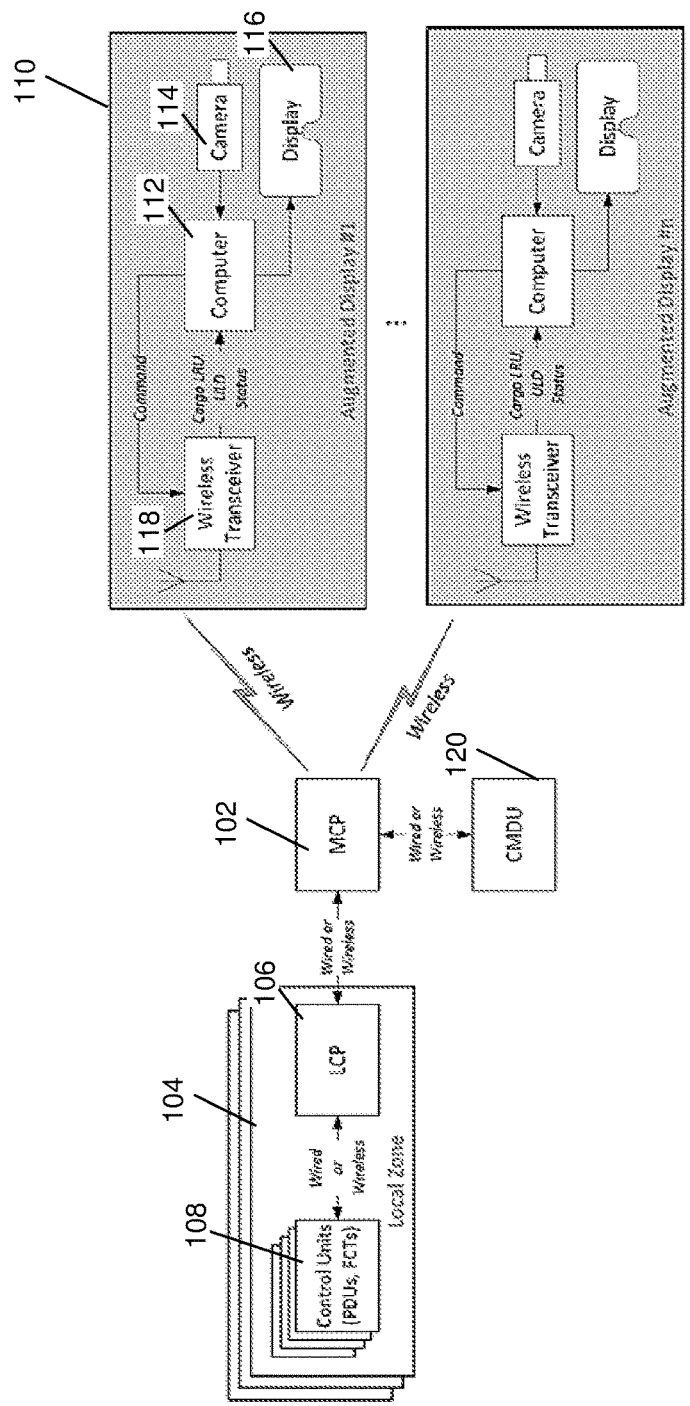
FIG. 1 depicts an architecture of an augmented reality-based cargo monitoring and control system in accordance with one or more embodiments.

Turning now to FIG. 1, the MCP 102 is configured to communicate with controllers located in the local zone 104 which include the LCP 106 and control units 108 such as the power drive units and FCTs. The MCP 102 is configured to communicate with one or more augmented display devices 110 which include a computer 112, a camera 114, a display 116, and a wireless transceiver 118. The MCP 102 is also configured to communicate with the CMDU 120 to display data regarding the cargo handling system 100. In one or more embodiments, the MCP 102 is configured to communicate over a wired or wireless communication channel with the controller of the local zone 104 and CMDU 120 and is further configured to communicate with one or more augmented display devices 110 over a wireless communication.

Figure 2:
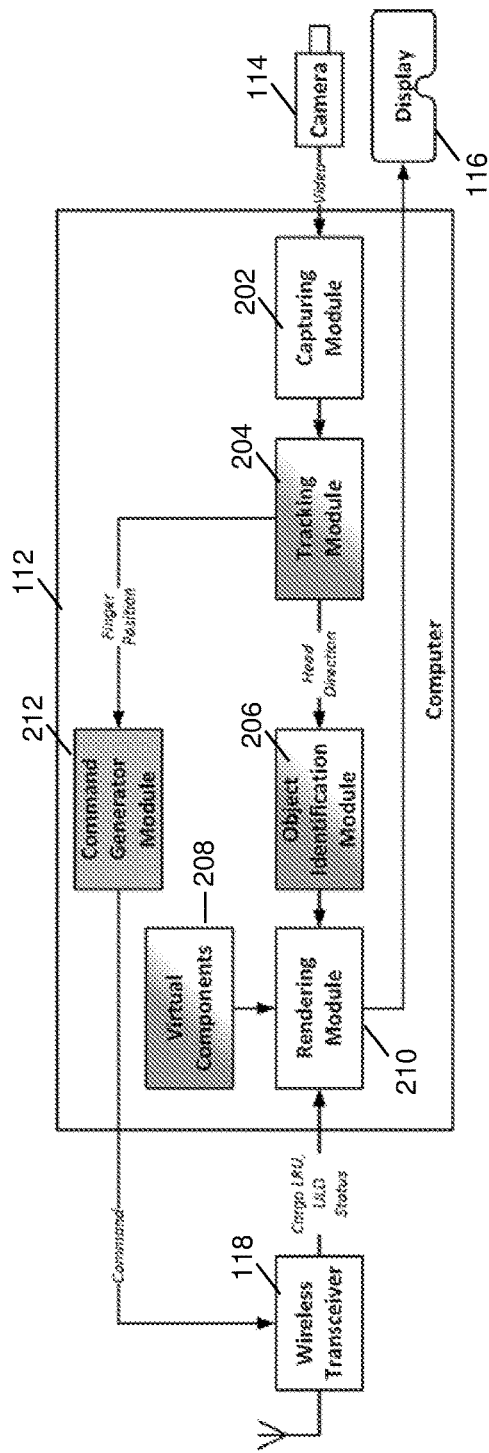
FIG. 2 depicts components of an augmented display device in accordance with one or more embodiments.

Now referring to FIG. 2, an augmented reality-based aircraft cargo monitoring and control system 200 in accordance with one or more embodiments is shown. In one or more embodiments, the system 200 includes the computer 112, camera 114, display 116 and wireless transceiver 118 shown in FIG. 1. FIG. 2 also provided further details on the computer 112. As shown in FIG. 2, the system includes a capturing module 202 that is configured to capture a video feed from the camera 114. The capturing module 202 is in communication with tracking module 204 that is configured to track various objects, such as a ULD, along a heading direction and is further configured to track an input, such as the finger of a user's hand, relative to the position of the display. In addition, the object identification module 206 is configured to identify an object such as a barcode that may be traveling in a particular direction, and the virtual components 208 includes a visual library which contains various symbols and iconology that is displayed as an augmented component in the display.

The rendering module 210 is configured to receive the cargo LRU status, ULD status, etc. from the MCP 102 using the wireless transceiver 118. In addition, the rendering module 210 is configured to render the augmented scene to be displayed on the eyewear display. The augmented scene is generated based on the cargo LRU and ULD statuses and the identified ULD. The command generator module 212 is configured to transmit the generated command to the MCP 102 using the wireless transceiver 118 to control the ULD.

Figure 3:
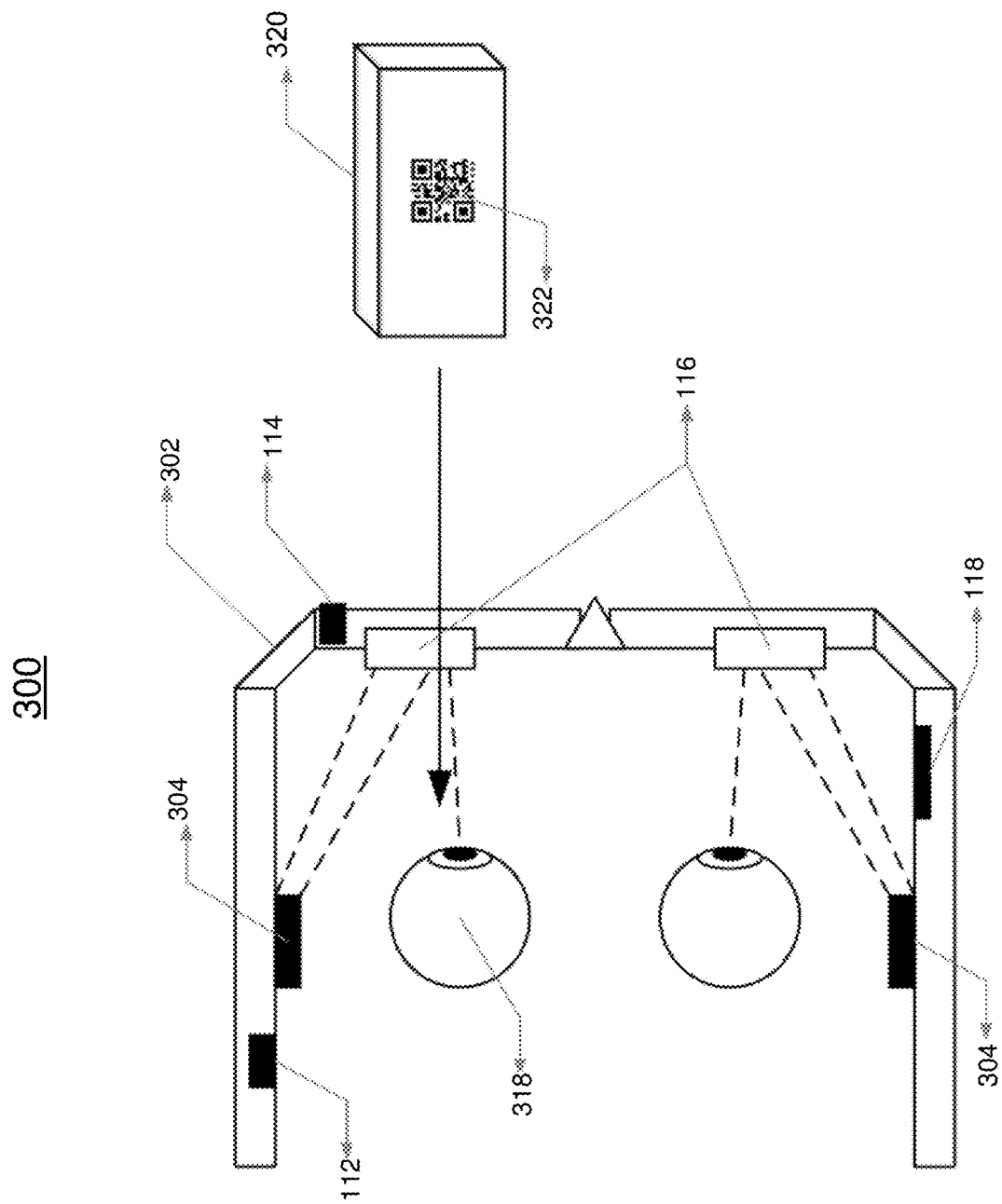
FIG. 3 depicts an eyewear device in accordance with one or more embodiments.

Now referring to FIG. 3, an eyewear system 300 including the components shown in FIGS. 1 and 2 are shown. The eyewear device 302 includes the computer 112, camera 114, and wireless transceiver 118. The eyewear device 302 also includes a first and second microprojector 304 to project indicators and status information on the display of the eyewear device 302. The eyewear device 302 is configured to be positioned on the operator 318. The eyewear device 302 is further configured to detect an object, such as the ULD 320, which includes an object identifier. In one or more embodiments, the object identifier may be at least one of a barcode or QR code 322.

Figure 4:
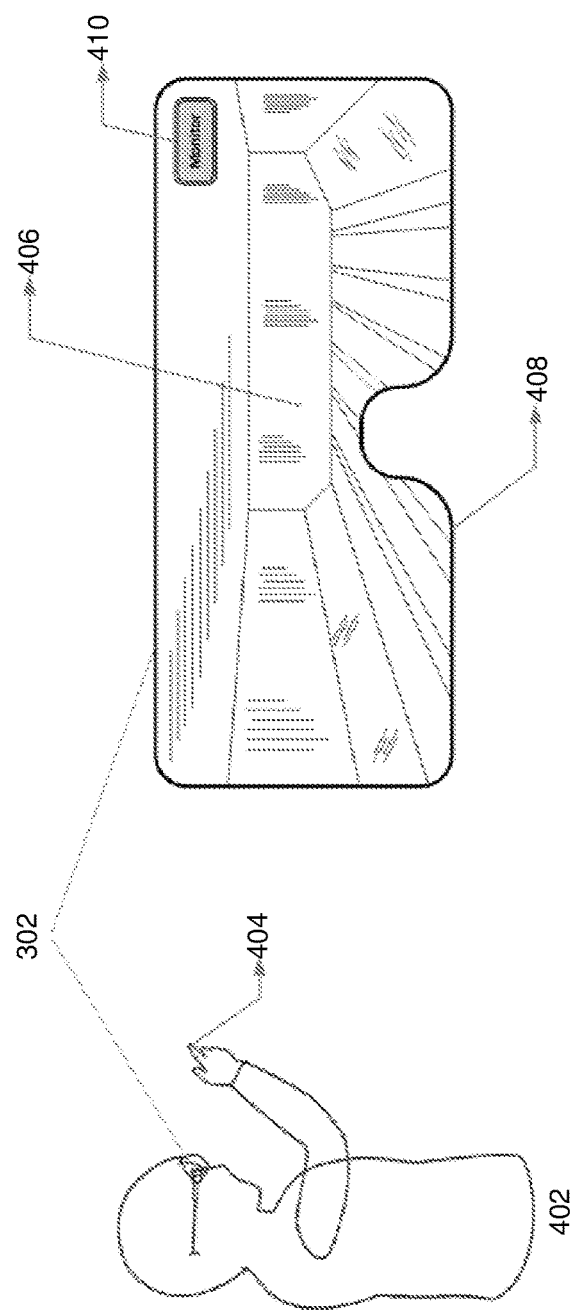
FIG. 4 depicts an operator interfacing with the augmented reality-based aircraft cargo monitoring and control system.
Figure 5:
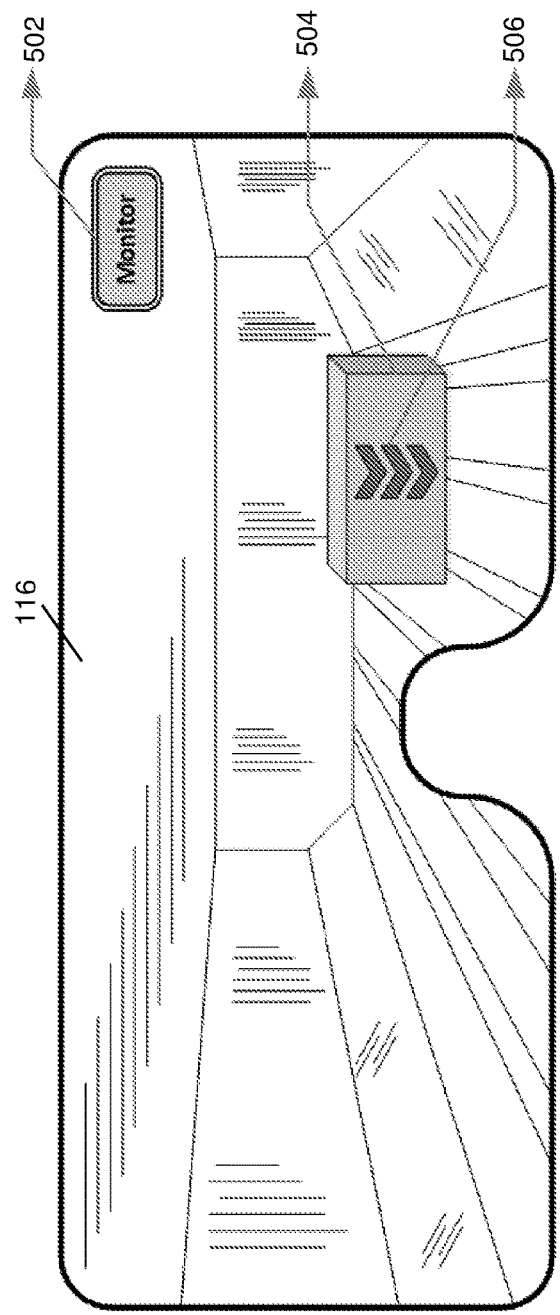
FIG. 5 depicts an eyewear display showing the ULD is moving towards the operator in accordance with one or more embodiments.

Now referring to FIG. 4, an augmented reality-based aircraft cargo monitoring and control system 400 is shown. An operator 402 is shown wearing the eyewear device 302 of FIG. 3. In one or more embodiments, the operator 402 is shown using the hand/finger 404 as a virtual selection tool to provide an input to communicate with an MCP of the system. The display includes a view of the cargo bay 406 and the view of the display as seen by the operator is shown in 408. In addition, the display also includes an operator selectable option 410 that can be selected using the hand/finger of the operator 404.

Figure 6:
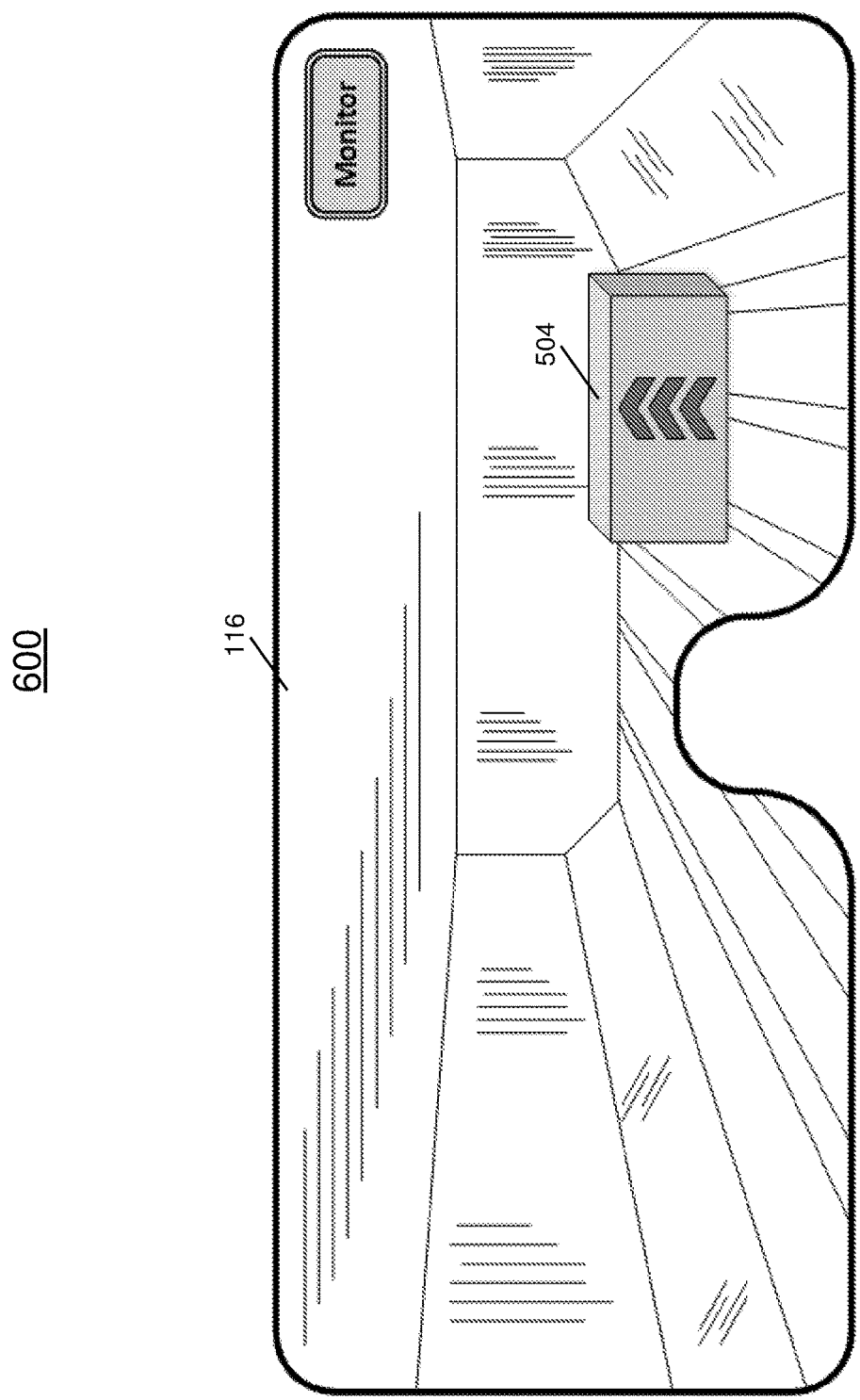
FIG. 6 depicts an eyewear display showing the ULD is moving away from the operator in accordance with one or more embodiments.
Figure 7:
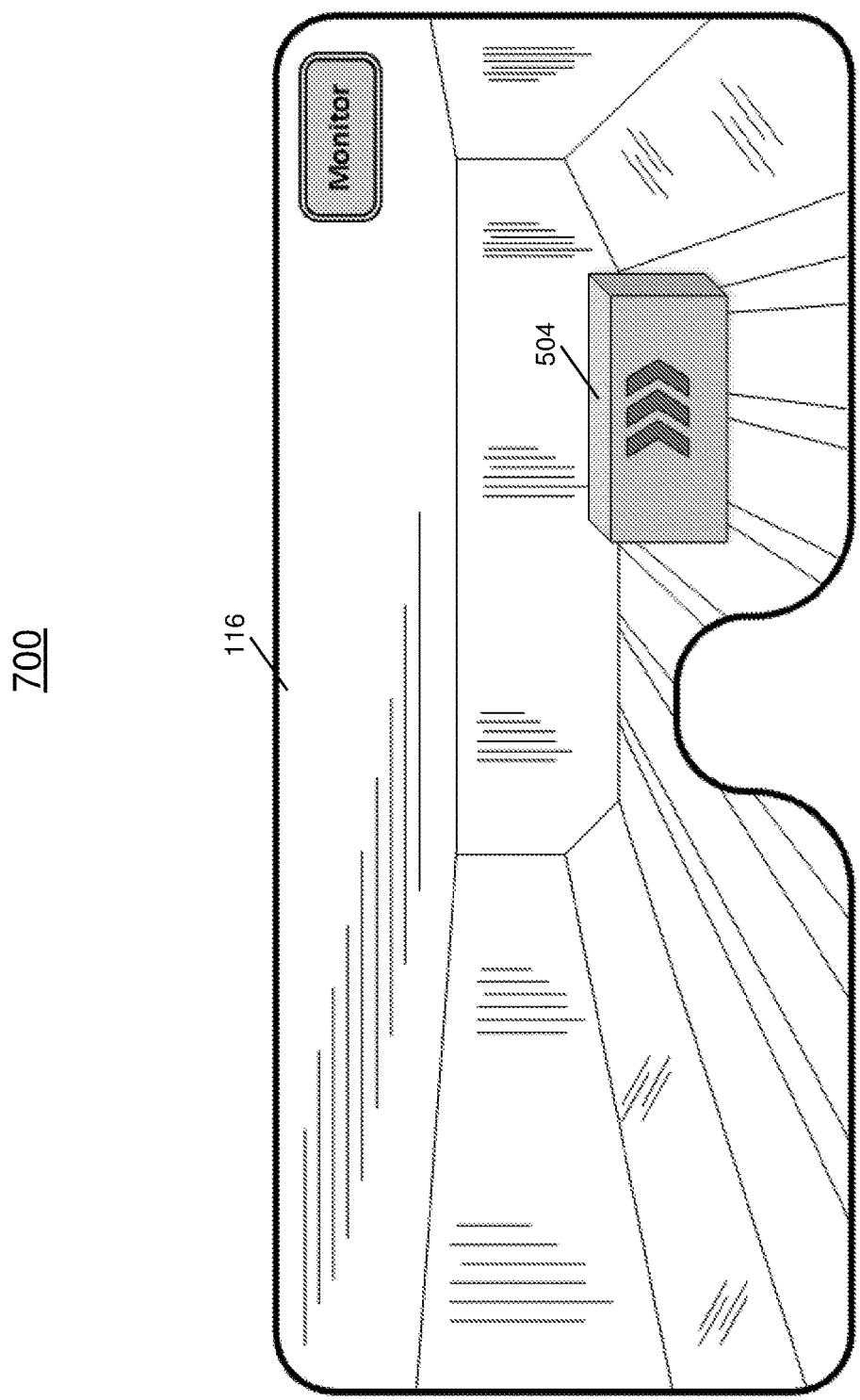
FIG. 7 depicts an eyewear display showing the ULD is moving right the operator in accordance with one or more embodiments.
Figure 8:
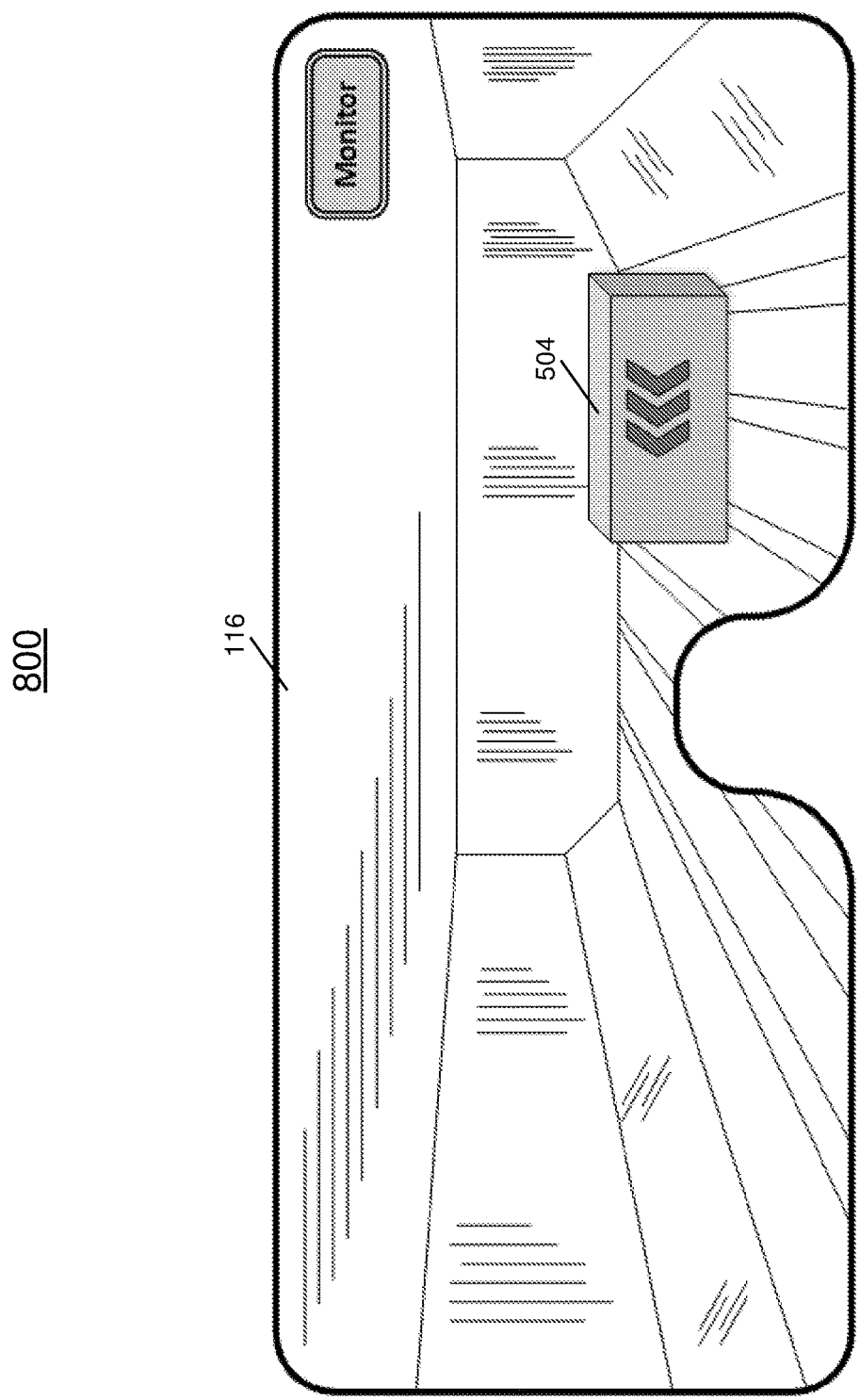
FIG. 8 depicts an eyewear display showing the ULD is moving left the operator in accordance with one or more embodiments.
Figure 9:
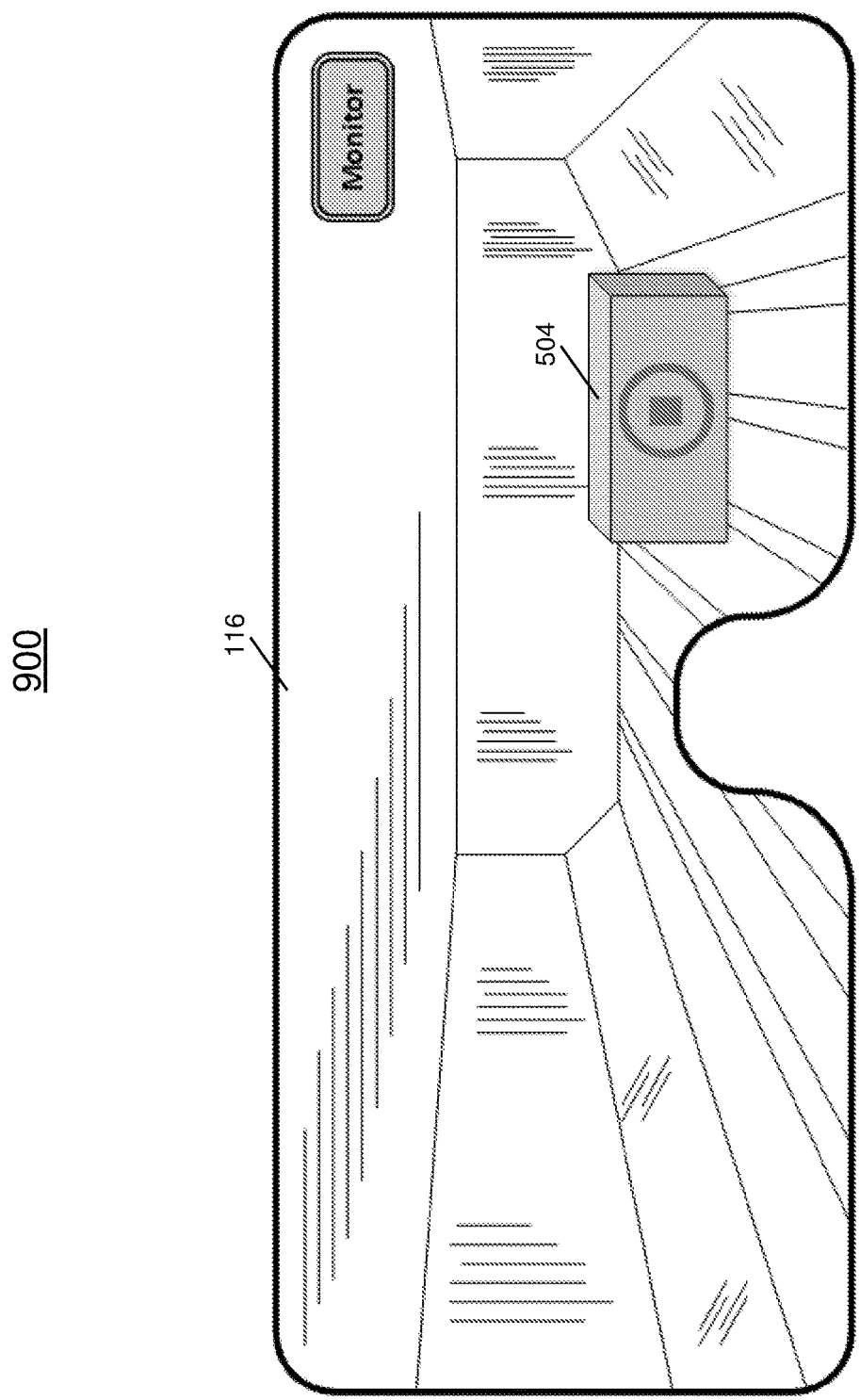
FIG. 9 depicts an eyewear display showing the ULD is in a stopped state in accordance with one or more embodiments.
Figure 10:
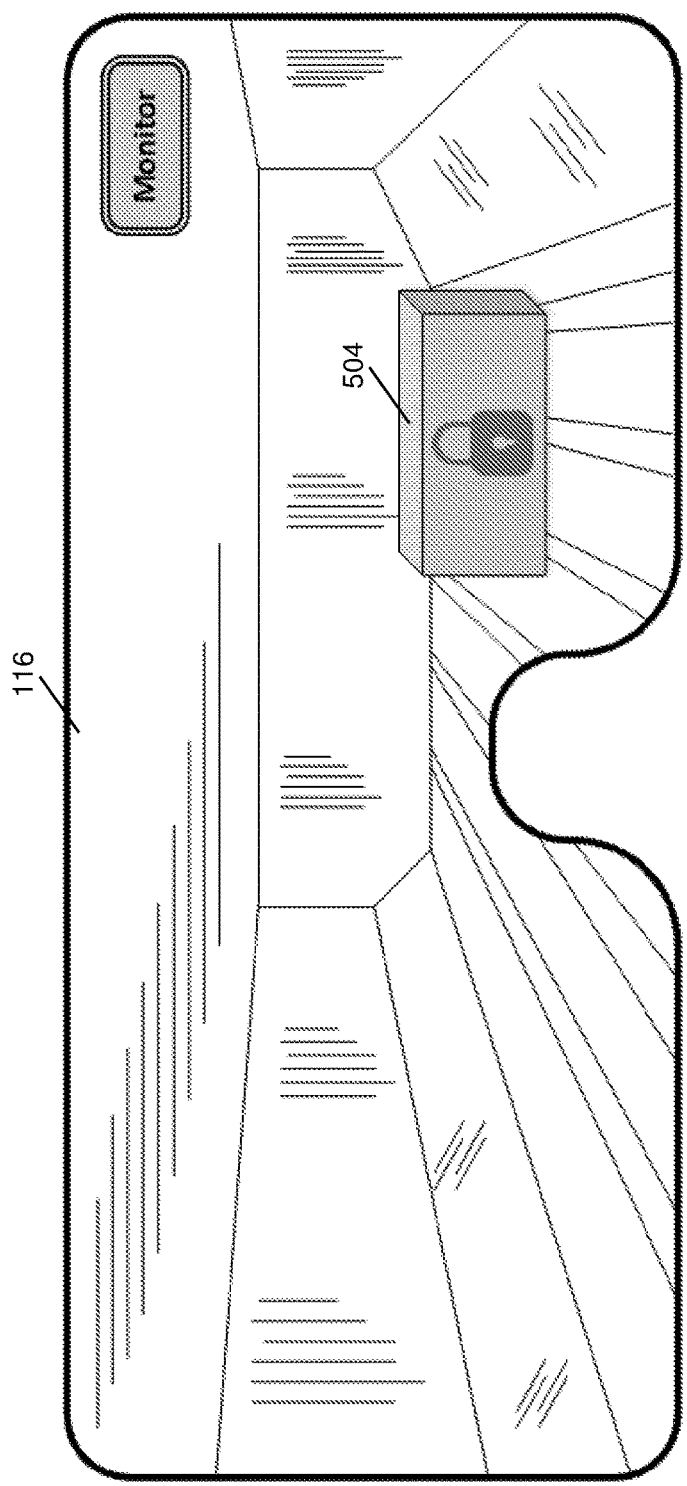
FIG. 10 depicts an eyewear display showing the ULD is in a locked state in accordance with one or more embodiments.
Figure 11:
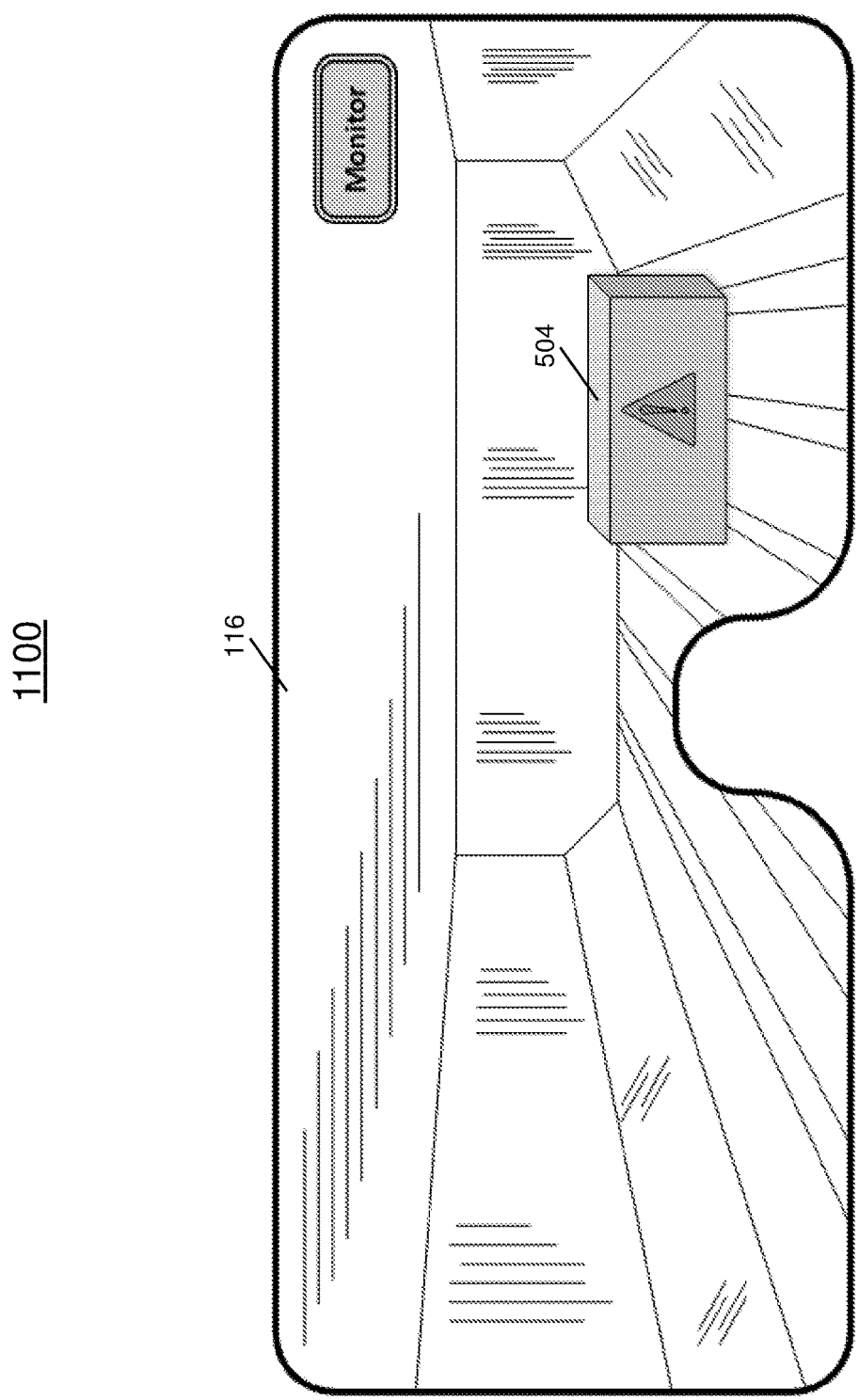
FIG. 11 depicts an eyewear display showing the ULD is in a fault/error state in accordance with one or more embodiments.
Figure 12:
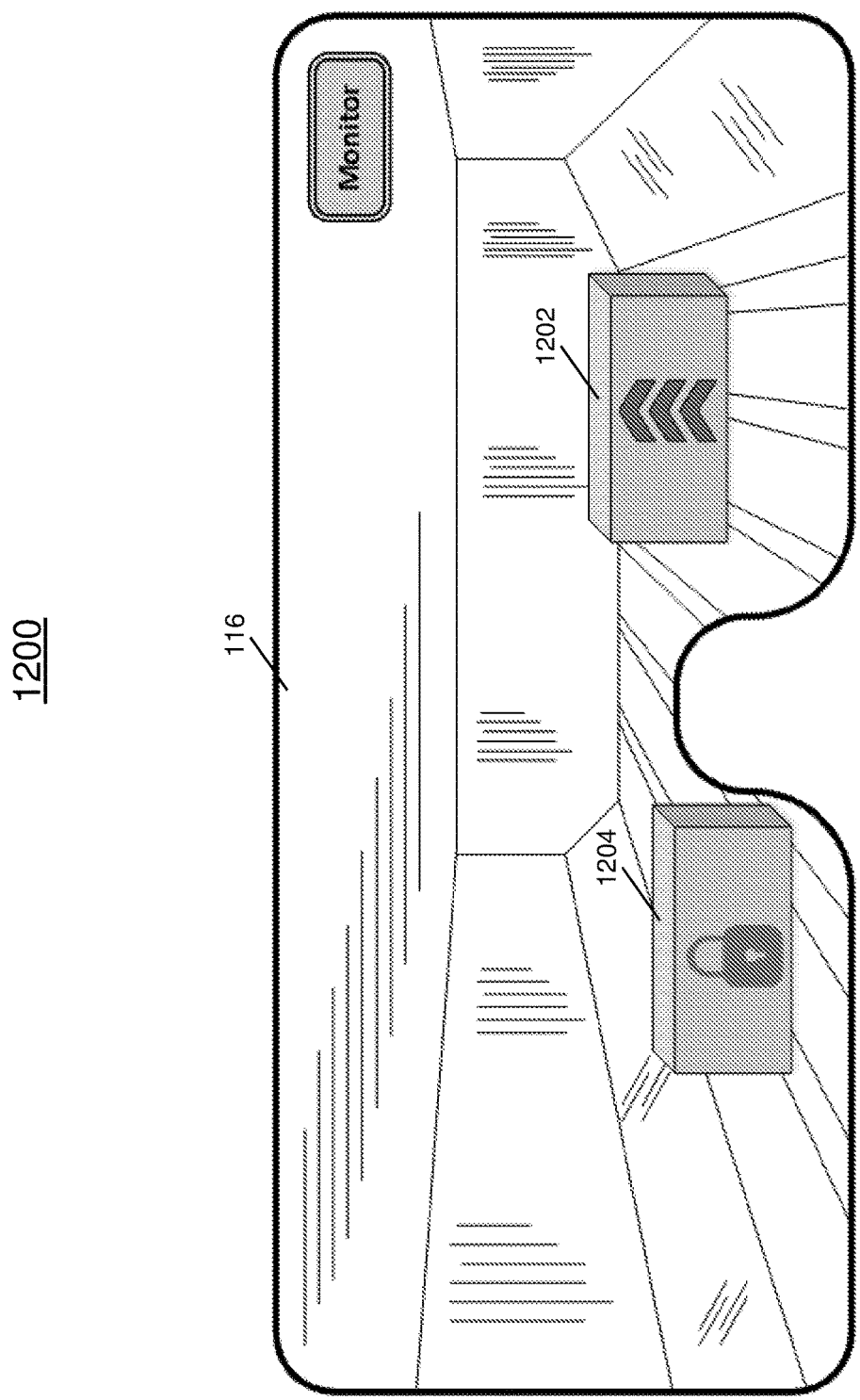
FIG. 12 depicts an eyewear display showing multiple ULDs simultaneously in accordance with one or more embodiments.

FIGS. 5 through 12 illustrate various states of the cargo ULD that is displayed on an augmented display 116 of a real object such as the ULD 504. Now referring to FIG. 5, a display 116 is configured in a monitor mode 502. The display 116 also depicts a ULD 504 that is moving towards the operator. A status or indicator 506 is overlaid on the ULD 504 to inform the operator of the movement of the direction. In FIG. 6, the display 116 indicates the ULD 504 is moving away from the operator. The status and the mode, in this case, the monitoring mode, are displayed on the eyewear display 116. In FIG. 7, the display 116 indicates the ULD 504 is moving to the right in relation to the operator. The status and the monitoring mode are displayed on the eyewear display 116. In FIG. 8, the display 116 indicates the ULD 504 is moving to the left in relation to the operator. The status and the monitoring mode are displayed on the eyewear display 116. In FIG. 9, the display 116 indicates the ULD 504 is in a stopped position. The status and the monitoring mode are displayed on the eyewear display 116. In FIG. 10, the display 116 indicates the ULD 504 is a locked position. The status and the monitoring mode are displayed on the eyewear display 116. In FIG. 11, the display 116 indicates the ULD 504 is in a fault/error state. The status and the monitoring mode are displayed on the eyewear display 114. FIG. 12 depicts an eyewear display 116 showing multiple ULDs 1202 and 1204 simultaneously.

Figure 13:
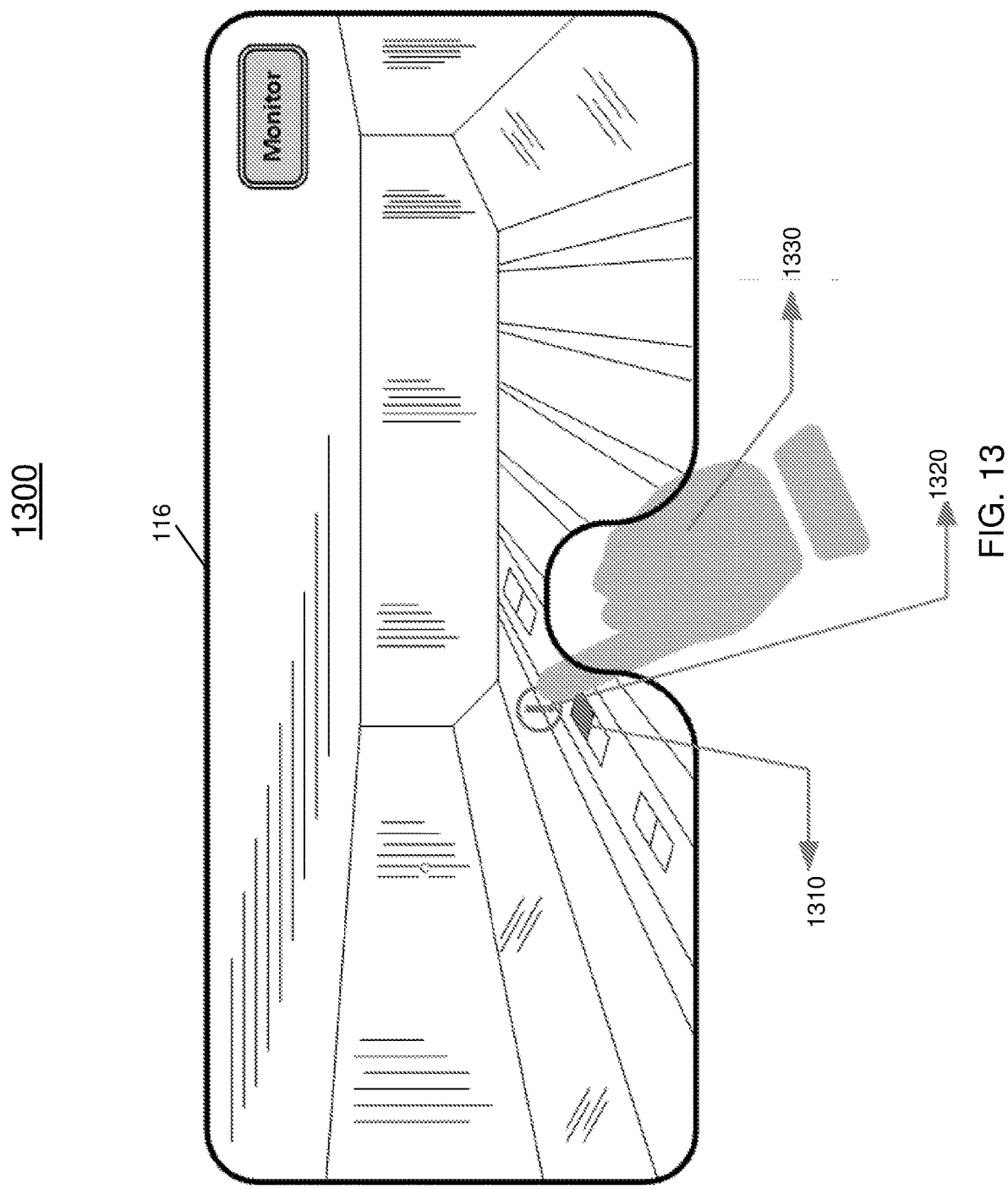
FIG. 13 depicts an eyewear display showing a PDU fault/error in accordance with one or more embodiments.
Figure 14:
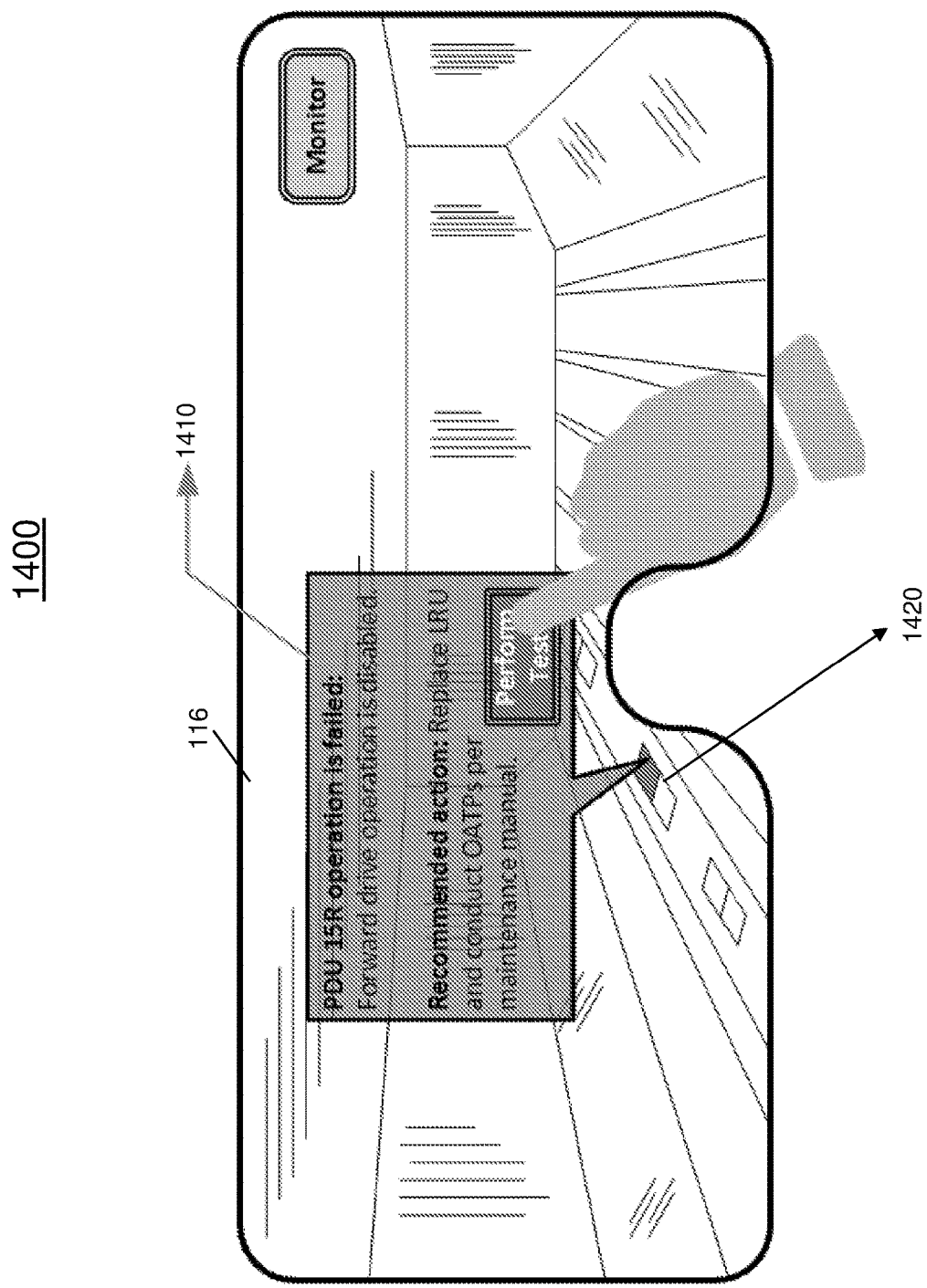
FIG. 14 depicts an eyewear display showing a diagnostic test in accordance with one or more embodiments.
Figure 15:
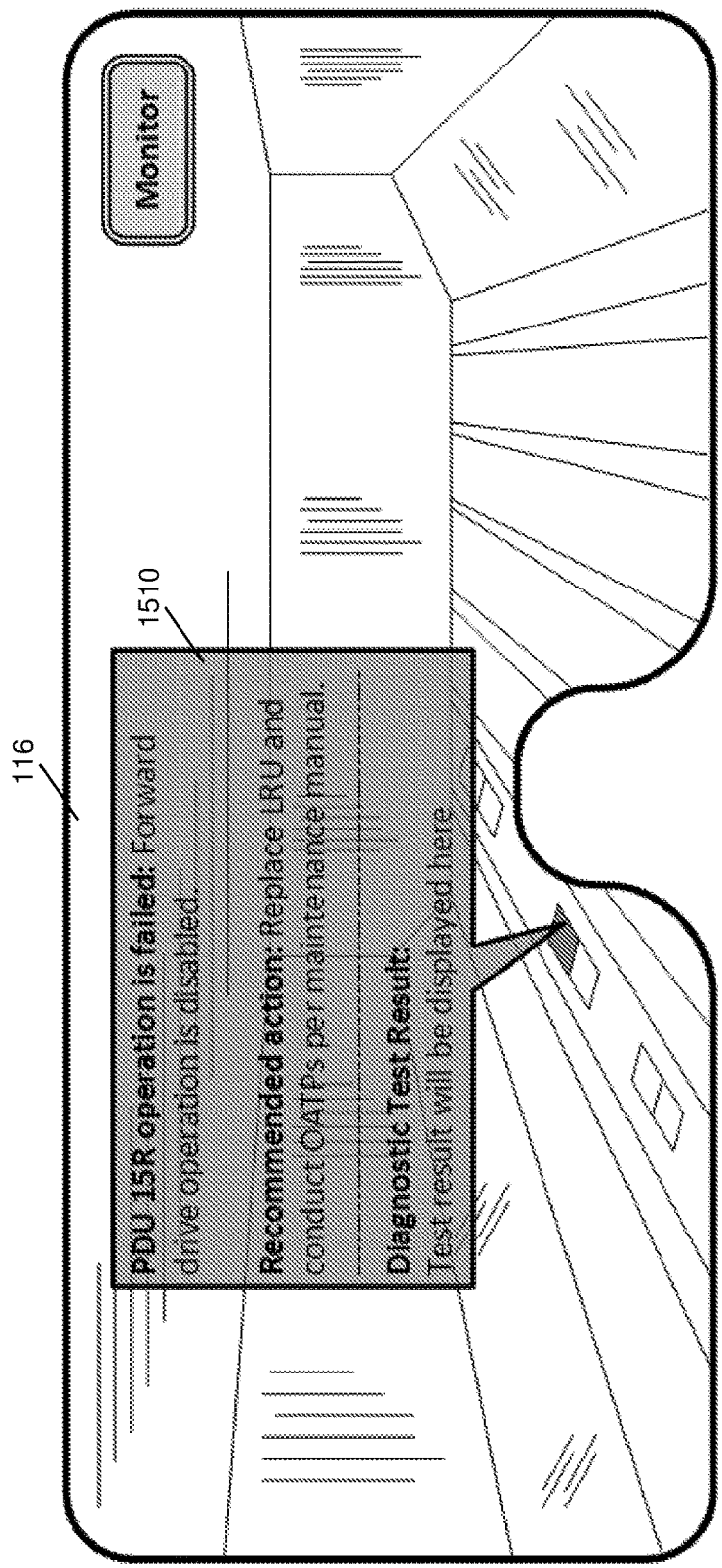
FIG. 15 depicts an eyewear display showing the results of a diagnostic test in accordance with one or more embodiments.

Now turning to FIGS. 13 through 15, a sequence for performing diagnostic tests for a detected fault in the augmented reality-based aircraft cargo monitoring and control system is shown. In FIG. 13, the eyewear display 116 shows a PDU 1310 that is in a fault/error state 1320 and an operator input selection 1330. The fault/error state 1320 is determined by the MCP and communicated to the eyewear device and presented to the operator. FIG. 14 depicts an eyewear display 116 showing a diagnostic test prompt 1410 that includes an operator selectable option to perform a diagnostic test for the faulty PDU 1420. FIG. 15 depicts an eyewear display 116 showing the results 1510 of performing the diagnostic test.

Figure 16:
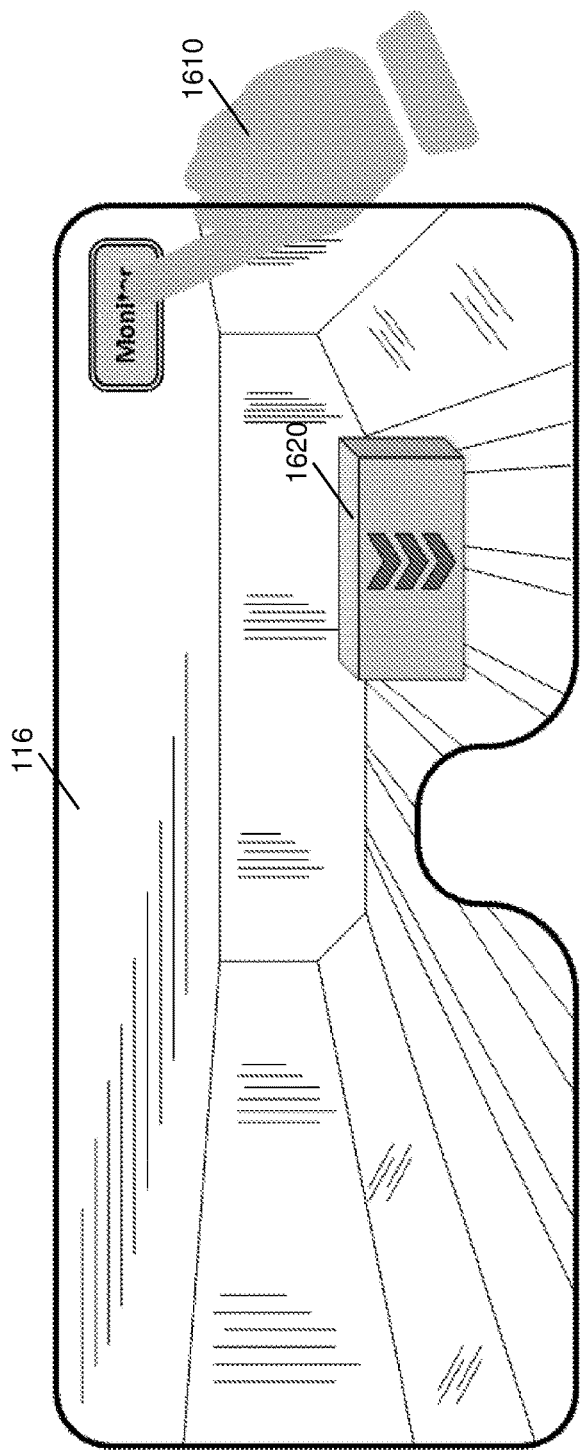
FIG. 16 depicts an eyewear display showing an operator input selection in accordance with one or more embodiments.
Figure 17:
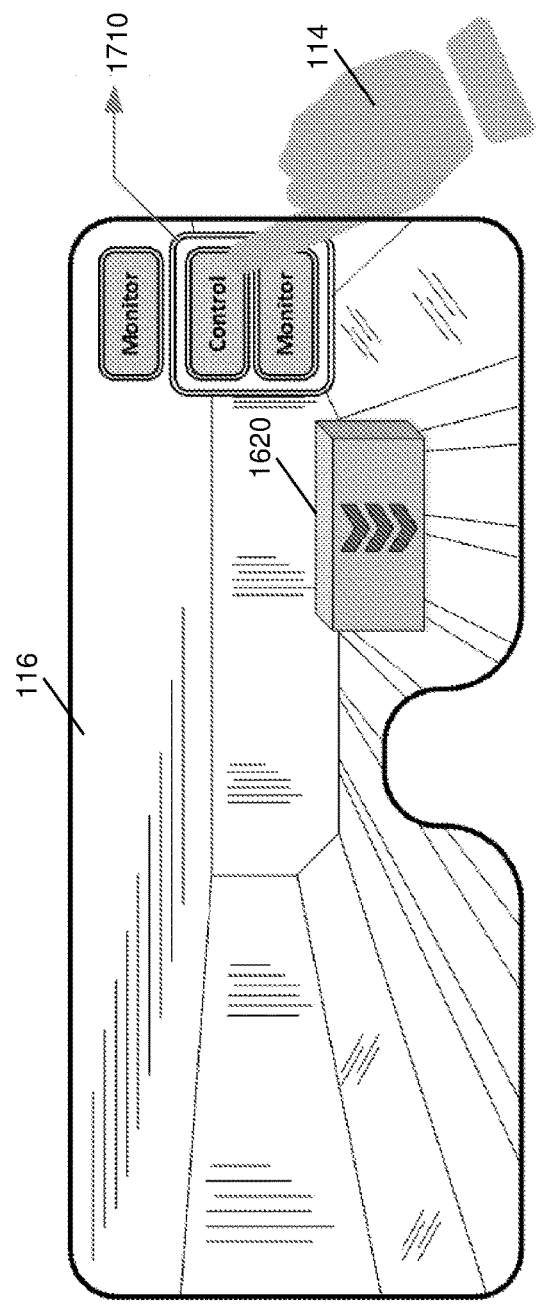
FIG. 17 depicts an eyewear display showing multiple control modes for the ULD in accordance with one or more embodiments.

FIGS. 16 and 17 illustrate a sequence for changing modes in an augmented reality-based aircraft cargo monitoring and control system. FIG. 16 illustrates the eyewear display 116 showing an operator's hand and/or finger 1610 position is used as an input selection tool on a user selectable option to monitor or control the ULD 1620. FIG. 17 depicts an eyewear display 116 showing multiple operator selectable control modes 1710 for controlling the ULD. In this example, two modes of operation are shown including a control mode and a monitor mode. The modes can be selected using an operator's finger as an input. It should be understood that additional modes can be included in the configuration to manage the cargo handling system.

Figure 18:
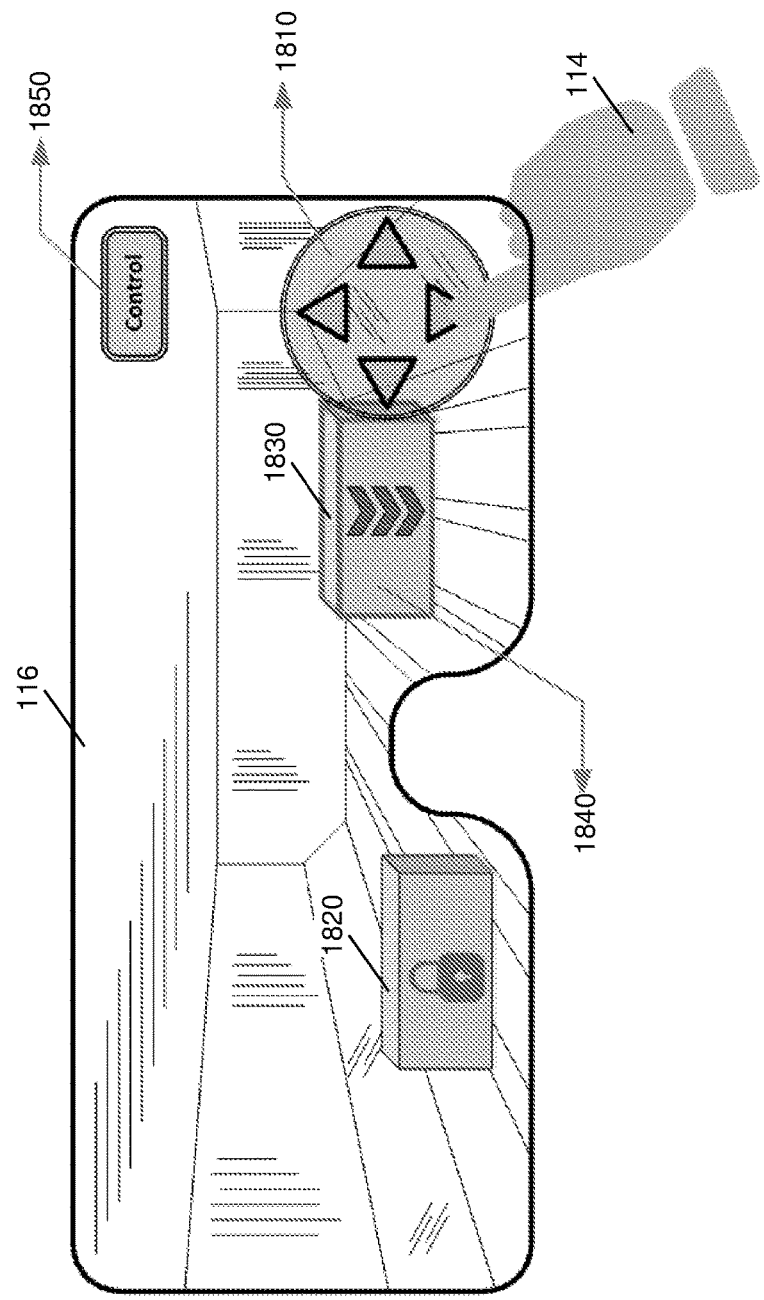
FIG. 18 depicts an eyewear display showing operator drives/control for a selected ULD in accordance with one or more embodiments.

FIG. 18 depicts an eyewear display 116 showing operator drives/control for a selected ULD. In one or more embodiments, the soft controls 1810 is overlaid on the display and is displayed relative the operator orientation in the cargo area. The orientation of the controls can be automatically updated to provide intuitive controls for the operator. The operator input 114 can be used to make a selection on the display 116 of the ULD 1820 and 1830. In this non-limiting example, the ULD 1830 has been selected indicated by the bold outlining 1840 of the ULD 1830. Also, the control mode 1850 is displayed and is an option that can be modified by the operator.

Figure 19:
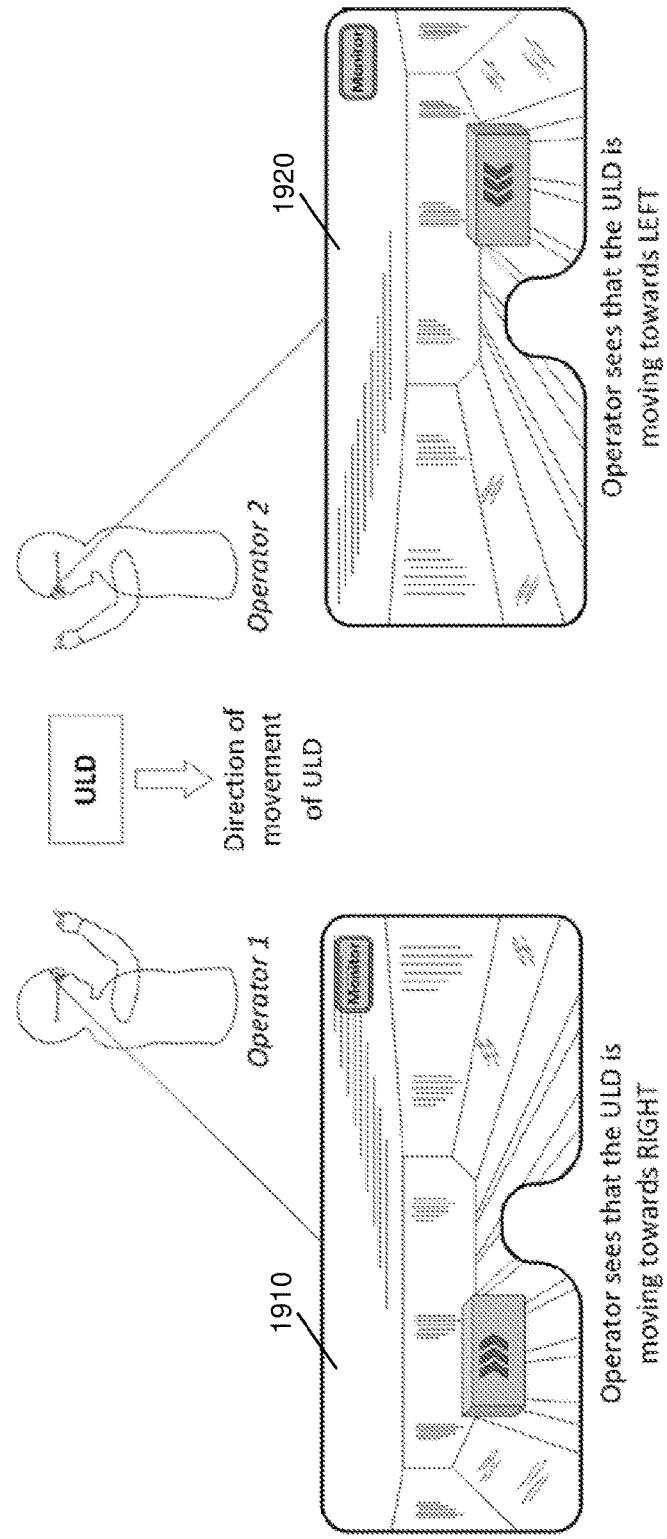
FIG. 19 depicts relative display of ULD status based on operator location and view directions for multiple viewers in accordance with one or more embodiments.

FIG. 19 shows a first operator 1 and a second operator 2 viewing the same ULD from different perspectives. As shown in the display 1910 of operator 1 the ULD is shown moving to the right relative to operator 1. The display 1920 of operator 2 indicates the ULD is moving to the left relative to operator 2.

Figure 20:
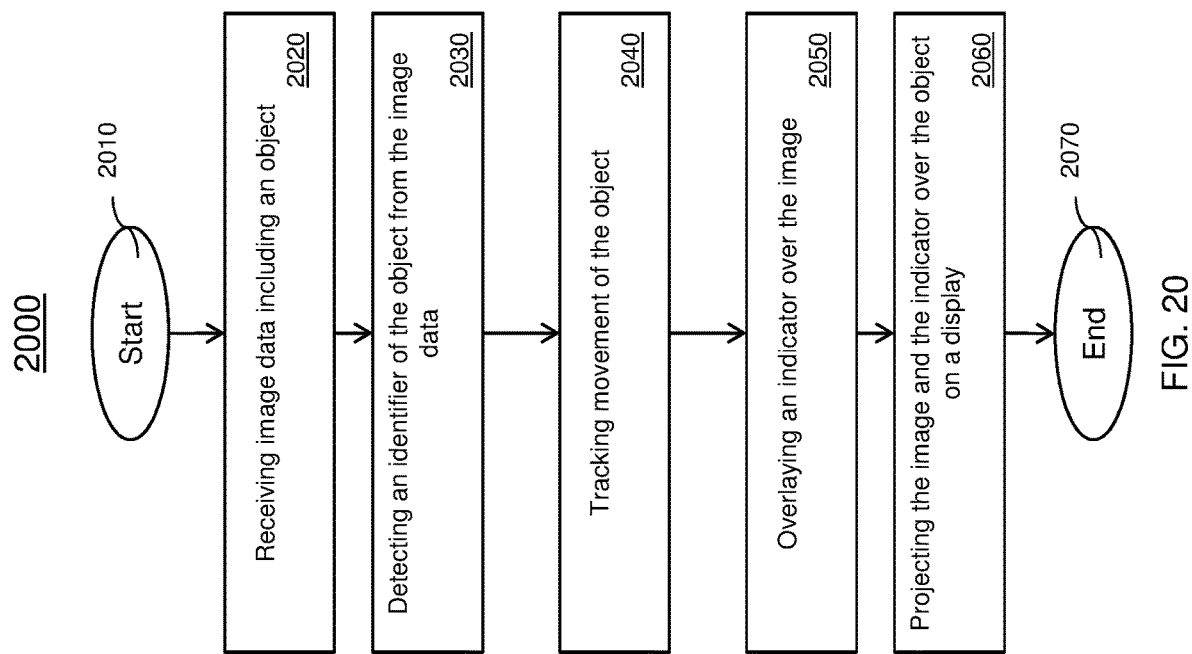
FIG. 20 depicts a flowchart of a method for operating an augmented reality-based aircraft cargo monitoring and control system in accordance with one or more embodiments.

Now referring to FIG. 20, a flowchart of a method 2000 for operating an augmented reality-based aircraft cargo monitoring and control system is shown. The method 2000 begins at block 2010 and continues to block 2020 which provides for receiving, by controlling device, image data including an object. The method 2000 proceeds to block 2030 which provides for detecting an identifier of the object from the image data. At block 2040, the method 2000 includes tracking the movement of the object and continues to block 2050 which includes overlaying an indicator over the image. The method 2000, at block 2060 provides for projecting the image and the indicator over the object on the display. The method 2000 ends at block 2070.

The technical effects and benefits provide enhancements to the existing cargo handling systems with hands-free and portable eyewear device which can be used as a display and control panel for easy control and monitoring of the cargo loading/unloading of the ULDs. The technical effects and benefits also include a reduction in aircraft weight where the portable eyewear device enables removal of control panels of MCP, OCP, and LCPs. In particular, the LCPs are replaced with the eyewear device and the eyewear device communicates wirelessly with the MCP which reduces the wires between the MCP, OCP, and LCPs. The technical effects and benefits improve the portability and safety by allowing the operator to move freely in the cargo compartment while maintaining control/monitor the ULDs. The operators are no longer at risk of getting stuck between the aircraft interior wall and the ULDs.

In addition, the technical effects and benefits include utilizing the eyewear device for both a monitoring device and control panel which helps reduce the aircraft LRU such as the CMDU or control panel thereby reducing weight from the aircraft. The technical effects and benefits also include the simultaneous and independent usage of multiple control and monitoring devices. These devices can control multiple ULDs simultaneously and independently which enables faster cargo loading/unloading. The technical effects and benefits provide an intuitive user interface enabling faster cargo loading where the display of the cargo and LRU statuses shown on the eyewear are relative to the operator location/position leading to less chance for errors during the cargo loading/unloading process. Finally, the technical effects and benefits provide a virtual control panel to control the ULD which provides the reduction/elimination of the training needs of the operators.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for an augmented reality-based aircraft cargo monitoring and control system, the system comprising:
   a controlling device in communication with a master control panel (MCP), wherein the controlling device comprises:
   a capturing module configured to receive an image;
   an object identification module configured to detect an identifier of an object from the image;
   a tracking module configured to track movement of the object;
   a rendering module configured to overlay an indicator over the image, wherein the indicator provides an indication of a direction of travel of the object that is overlaid over the object, wherein the indicator comprises soft controls that are operator-selectable, wherein the soft controls are configured to control the object; and
   one or more microprojectors configured to project the image on a display, wherein the display is configured to display a first monitoring mode or a second controlling mode, the soft controls, and status of the control system, wherein the controlling device is configured to operate the system in the first monitoring mode and the second controlling mode, wherein when in the second controlling mode soft controls are presented on the display, wherein when in the monitoring mode the soft controls are removed from the display;
   wherein the MCP is configured to perform a diagnostic test, responsive to an input from an operator; and
   wherein the display is configured to present results of the diagnostic test.

2. The system of claim 1, wherein the indicator is based at least in part on data received from the MCP.

3. The system of claim 1, wherein the controlling device is configured to communicate with the MCP to control the movement of the object.

4. The system of claim 1, wherein the controlling device is comprised in an eyewear device.

5. The system of claim 1, wherein the tracking module is configured to detect an operator hand as an input to control the object.

6. The system of claim 1, wherein the object identifier is at least one of a QR code or barcode.

7. The system of claim 1, wherein the image is real-time video data of a cargo loading area.

8. A method for operating an augmented reality-based aircraft cargo monitoring and control system, the method comprising:
   receiving, by controlling device, image data including an object;
   detecting an identifier of the object from the image data;
   tracking movement of the object;
   overlaying an indicator over the image, wherein the indicator provides an indication of a direction of travel of the object that is overlaid over the object, wherein the indicator comprises soft controls that are operator-selectable, wherein the soft controls are configured to control the object;
   projecting the image and the indicator over the object on a display;
   operating the controlling device in a first monitoring mode and a second controlling mode, wherein when in the second controlling mode soft controls are presented on the display, wherein when in the first monitoring mode the soft controls are removed from the display;
   performing a diagnostic test, responsive to an input from the operator; and
   presenting results of the diagnostic test.

9. The method of claim 8, wherein the indicator is based at least in part on data received from a master control panel (MCP).

10. The method of claim 8, wherein the controlling device is configured to communicate with the MCP to control the movement of the object.

11. The method of claim 8, wherein the controlling device is comprised in an eyewear device.

12. The method of claim 8, wherein the controlling device is configured to detect an operator hand as an input to control the object.

13. The method of claim 8, wherein the object identifier is at least one of a QR code or barcode.

14. The method of claim 8, wherein the image is real-time video data of a cargo loading area.

* * * * *